US008226332B2

(12) United States Patent
Kojima et al.

(10) Patent No.: US 8,226,332 B2
(45) Date of Patent: Jul. 24, 2012

(54) LIQUID TRANSPORTING METHOD AND CLASSIFYING METHOD

(75) Inventors: Hiroshi Kojima, Kanagawa (JP); Seiichi Takagi, Kanagawa (JP); Kazuya Hongo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 158 days.

(21) Appl. No.: 12/712,722

(22) Filed: Feb. 25, 2010

(65) Prior Publication Data

US 2011/0011462 A1 Jan. 20, 2011

(30) Foreign Application Priority Data

Jul. 16, 2009 (JP) ................................ 2009-167812

(51) Int. Cl.
*B65G 51/00* (2006.01)

(52) U.S. Cl. ........... 406/198; 406/86; 406/191; 406/197

(58) Field of Classification Search .................... 406/86, 406/191, 197, 198
See application file for complete search history.

(56) References Cited

U.S. PATENT DOCUMENTS 4,759,840 A * 7/1988 McIntyre et al. ............. 209/135
5,204,002 A * 4/1993 Belfort et al. ................. 210/634
6,120,666 A * 9/2000 Jacobson et al. .............. 204/452
6,159,739 A * 12/2000 Weigl et al. ...................... 436/52
6,454,945 B1 * 9/2002 Weigl et al. .................... 210/634
7,115,230 B2 * 10/2006 Sundararajan et al. ....... 422/502
7,182,552 B2 * 2/2007 Takagi et al. ................... 406/86
7,182,553 B2 * 2/2007 Takagi et al. ................... 406/86
7,311,476 B2 * 12/2007 Gilbert et al. ................. 406/198
7,328,807 B2 * 2/2008 Takagi et al. ............. 209/172.5
7,770,738 B2 * 8/2010 Tabata et al. .................. 209/680
7,802,686 B2 * 9/2010 Takagi et al. ............. 209/172.5
7,997,831 B2 * 8/2011 Gilbert et al. ................. 406/198
8,120,770 B2 * 2/2012 Huang et al. .................. 356/246
2004/0266022 A1 * 12/2004 Sundararajan et al. ....... 436/180
2005/0249034 A1 11/2005 Takagi et al.
2006/0070921 A1 4/2006 Takagi et al.
2008/0134471 A1 * 6/2008 Verdoes et al. ............ 23/295 R
2008/0240987 A1 * 10/2008 Yamada et al. ............. 422/68.1
2009/0050538 A1 * 2/2009 Lean et al. .................... 209/155
2009/0066936 A1 * 3/2009 Huang et al. .................... 356/73

(Continued)

FOREIGN PATENT DOCUMENTS

JP A-2004-330008 11/2004

(Continued)

OTHER PUBLICATIONS

"The Influence of Flow Path Depth on Performance of Micro Channel Separator/Classifier," vol. 30, No. 2, pp. 135-140 (with partial translation).

*Primary Examiner* — Joseph A Dillon, Jr.
(74) *Attorney, Agent, or Firm* — Oliff & Berridge, PLC

(57) ABSTRACT

A method for transporting dispersion, includes: introducing dispersion containing particles into a liquid transporting channel from a dispersion introducing port; transporting the dispersion in a laminar flow through the liquid transporting channel; and discharging the dispersion from a downstream of the liquid transporting channel, and the liquid transporting channel has a bent portion in a vertical direction, and a Dean vortex which cancels an exchange flow that is produced by movement of the particles caused by gravitational force is generated in the bent portion.

17 Claims, 7 Drawing Sheets

U.S. PATENT DOCUMENTS

2010/0021984 A1* 1/2010 Edd et al. ..................... 435/174
2010/0072116 A1* 3/2010 Tabata et al. .................. 209/646
2010/0314263 A1* 12/2010 Lean et al. .................... 205/751
2010/0314327 A1* 12/2010 Lean et al. .................... 210/738
2011/0096327 A1* 4/2011 Papautsky et al. ............ 356/335
2011/0112216 A1* 5/2011 Van De Runstraat et al. ............................ 523/313
2011/0223314 A1* 9/2011 Zhang et al. .................. 427/2.1

FOREIGN PATENT DOCUMENTS

JP A-2005-319409 11/2005
JP A-2006-116520 5/2006

* cited by examiner

LIQUID TRANSPORTING METHOD AND CLASSIFYING METHOD

CROSS-REFERENCE TO RELATED APPLICATIONS

This application is based on and claims priority under 35 USC 119 from Japanese Patent Application No. 2009-167812 filed on Jul. 16, 2009.

BACKGROUND

1. Technical Field

The present invention relates to a liquid transporting method and a classifying method.

2. Related Art

Recently, a chemical engineering unit operation using a microchannel attracts attention. In the case where a microchannel is used, fluid is formed as a laminar flow, and not disturbed. As a usual method of avoiding deposition of particles and clogging of a channel, therefore, there is a method in which a dispersion medium that is equal in density to the particles is used. When the method is employed, particles are not sedimented, and hence it is possible to prevent deposition and clogging from occurring.

SUMMARY

According to an aspect of the invention, there is provided a method of transporting dispersion which includes: introducing dispersion containing particles into a liquid transporting channel from a dispersion introducing port; transporting the dispersion in a laminar flow through the liquid transporting channel; and discharging the dispersion from a downstream of the liquid transporting channel, in which the liquid transporting channel includes a bent portion in a vertical direction, and a Dean vortex which cancels an exchange flow that is produced by movement of the particles caused by gravitational force is generated in the bent portion.

BRIEF DESCRIPTION OF THE DRAWINGS

Exemplary embodiments of the present invention will be described in detail based on the following figures, wherein.

DESCRIPTION OF REFERENCE NUMERALS AND SIGNS

Figure 1A:
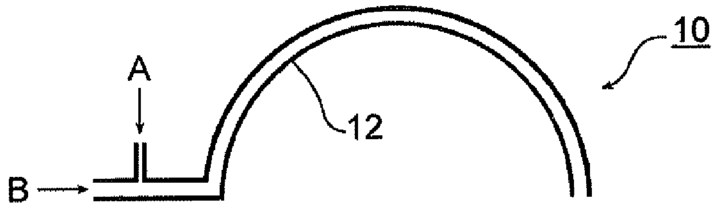
FIGS. 1A, 1B, 1C and 1D show examples of a side view of a liquid transporting apparatus which is used in an exemplary embodiment.
Figure 1B:
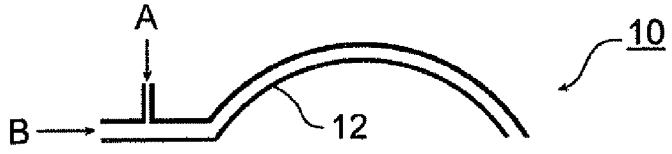
Figure 1C:
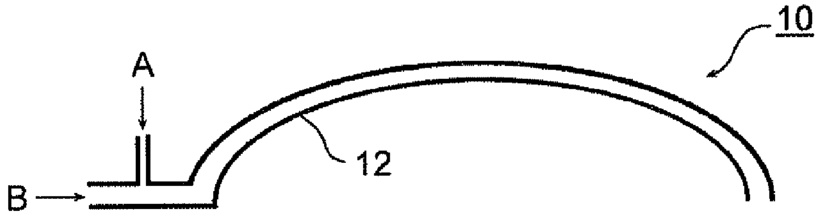
Figure 1D:
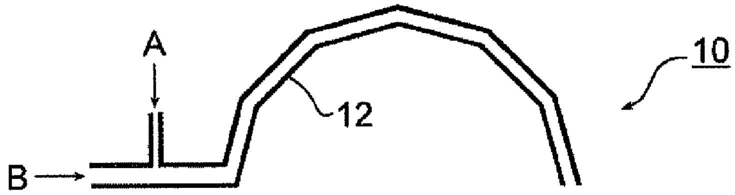

A dispersion
B transporting liquid
10 liquid transporting apparatus
12 liquid transporting channel
15 upper inlet
16 lower inlet
21 upper discharging channel
22 lower discharging channel

DETAILED DESCRIPTION

The method of transporting dispersion according to the invention is characterized in that the method includes the steps of: introducing dispersion containing particles into a liquid transporting channel from a dispersion introducing port; transporting the dispersion in a laminar flow through the liquid transporting channel; and discharging the dispersion from a downstream of the liquid transporting channel, the liquid transporting channel includes a bent portion in the vertical direction, and a Dean vortex which cancels an exchange flow that is produced by movement of the particles caused by gravitational force is generated in the bent portion.

In the exemplary embodiment, in the dispersion containing particles, preferably, the specific gravity of the particles is larger than that of the dispersion medium of the dispersion. In this case, particles are sedimented in the dispersion.

Hereinafter, the exemplary embodiment will be described in further detail with reference to the drawings. In the following description, unless otherwise specified, the same reference numerals denote identical components. In the following description, unless otherwise specified, furthermore, the terms “A to B” indicating a numerical range mean “equal to or larger than A and equal to or smaller than B”. Namely, the terms mean a numerical range including A and B which are the end points.

The inventors have found that, in the case where the dispersion is introduced from the upper side (the ceiling side) of a channel in which the liquid transportation direction extends horizontally, and classification is performed by using sedimentation of particles while the liquid is transported through the channel, sedimentation of particles occurs at a flow velocity which is equal to or higher than the terminal sedimentation velocity that is calculated by Stokes equation.

As a result of intensive study conducted by the inventors, it has been found that this phenomenon is caused by the influence of an exchange flow.

Hereinafter, the exchange flow will be described.

When particles are sedimented by gravitational force, fluid is moved in order to fill the volume where the particles have existed. The movement of fluid due to such sedimentation of particles is called an exchange flow. In the case where the particle density is sufficiently low, fluid is moved through gaps between particles, and hence the movement exerts substantially no influence. By contrast, in the case where the particle density is high, the distance between particles is short, and hence particles cannot be easily moved as compared with the case where the particle density is sufficiently low, so that an exchange flow is generated in a state where particles aggregate at a certain extent. As a result, it is seemed that sedimentation of particles occurs at a flow velocity which is equal to or higher than the terminal sedimentation velocity that is calculated by Stokes equation.

In the cases where particles separate from the sidewall (FIGS. 6A and 6B), and where particles exist also in the vicinity of the sidewall (FIGS. 7A and 7B), an exchange flow influences the particles in different manners.

FIGS. 6A and 6B, and 7A and 7B are diagrams showing the behavior of particles, and showing a section of a channel in the case where a dispersion is introduced from the upper side (the ceiling side) of the channel.

Figure 6A:
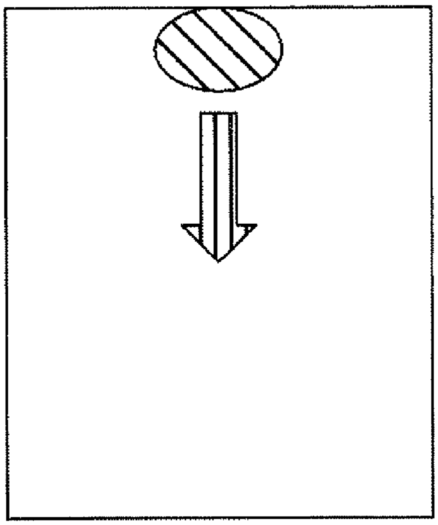
FIGS. 6A and 6B are diagrams showing an example of the behavior of particles.
Figure 6B:
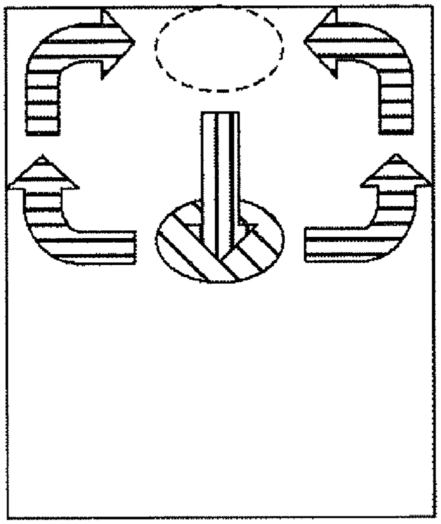
Figure 6B:
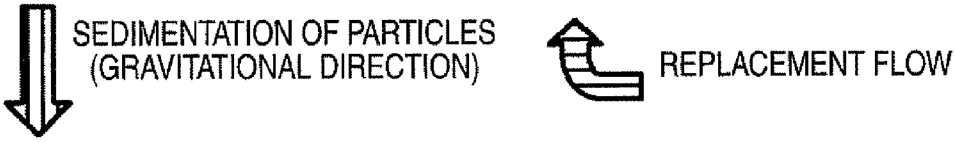

In the case where particles separate from the sidewall and exist in a middle portion of the channel width as shown in FIGS. 6A and 6B, when the particles are downwardly sedimented, the fluid flows from the lateral side of the particle so as to fill the volume where the particles have existed. In the vicinity of the middle, an exchange flow is generated in the sedimentation direction, and, in the vicinity of the sidewall, an exchange flow is generated in the direction opposite to the sedimentation direction, whereby a vortex is formed. Namely, the exchange flow flows downwardly in the middle of the channel, and upwardly in the vicinity of the sidewall. As a result, a downward force due to the exchange flow is applied to the particles. In Stokes equation, the terminal velocity is determined by a balance between the gravitational force which downwardly acts on the particles, and the resistance force and buoyancy which apply upward force. However, the exchange flow downwardly affects the particles. Therefore, it is observed that the particles are sedimented at a velocity which is higher than the terminal velocity.

Figure 7A:
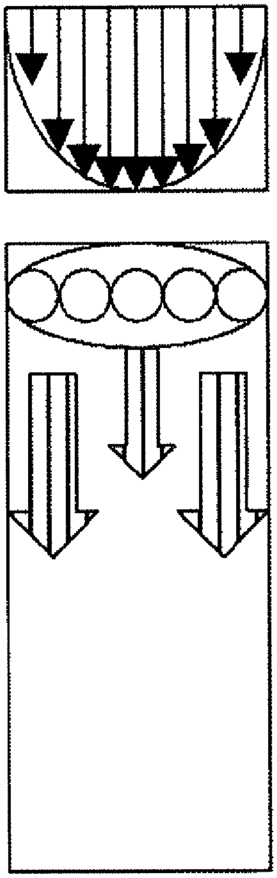
FIGS. 7A and 7B are diagrams showing another example of the behavior of particles.
Figure 7B:
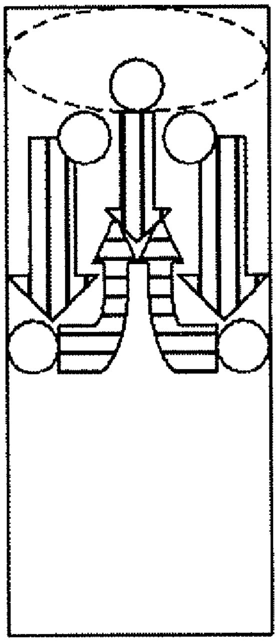
Figure 7B:
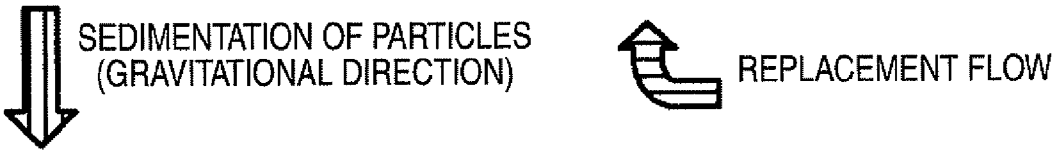

By contrast, in the case where particles are in the vicinity of the sidewall of the channel as shown in FIGS. 7A and 7B, fluid cannot flow from the lateral side of the particles unlike the case of FIGS. 6A and 6B. When the transportation velocity of the particles is compared at the same height in the vertical direction (when compared in the width direction in a section which is parallel to the travelling direction in the channel), a plane Poiseuille flow is formed. As shown in the upper portion of FIG. 7A, the flow velocity shows a parabolic distribution, and is highest in the middle of the horizontal direction of the channel. Namely, the particles are slowly moved in the transportation direction in the vicinity of the sidewall as compared with the middle of the channel. Therefore, particles in the vicinity of the sidewall are apparently more rapidly sedimented with respect to the horizontal distance as compared with the middle of the channel. As a result, the particle distribution in a section of the channel shows an inverted U shape, and, in accordance with this motion, a vortex which is directed oppositely to that of FIG. 6B is formed.

In the exemplary embodiment, a Dean vortex which cancels the above-described exchange flow generated, whereby sedimentation and deposition of particles are suppressed. In the exemplary embodiment, a Dean vortex is obtained by a process in which a Dean vortex is generated by using centrifugal force.

Figure 8:
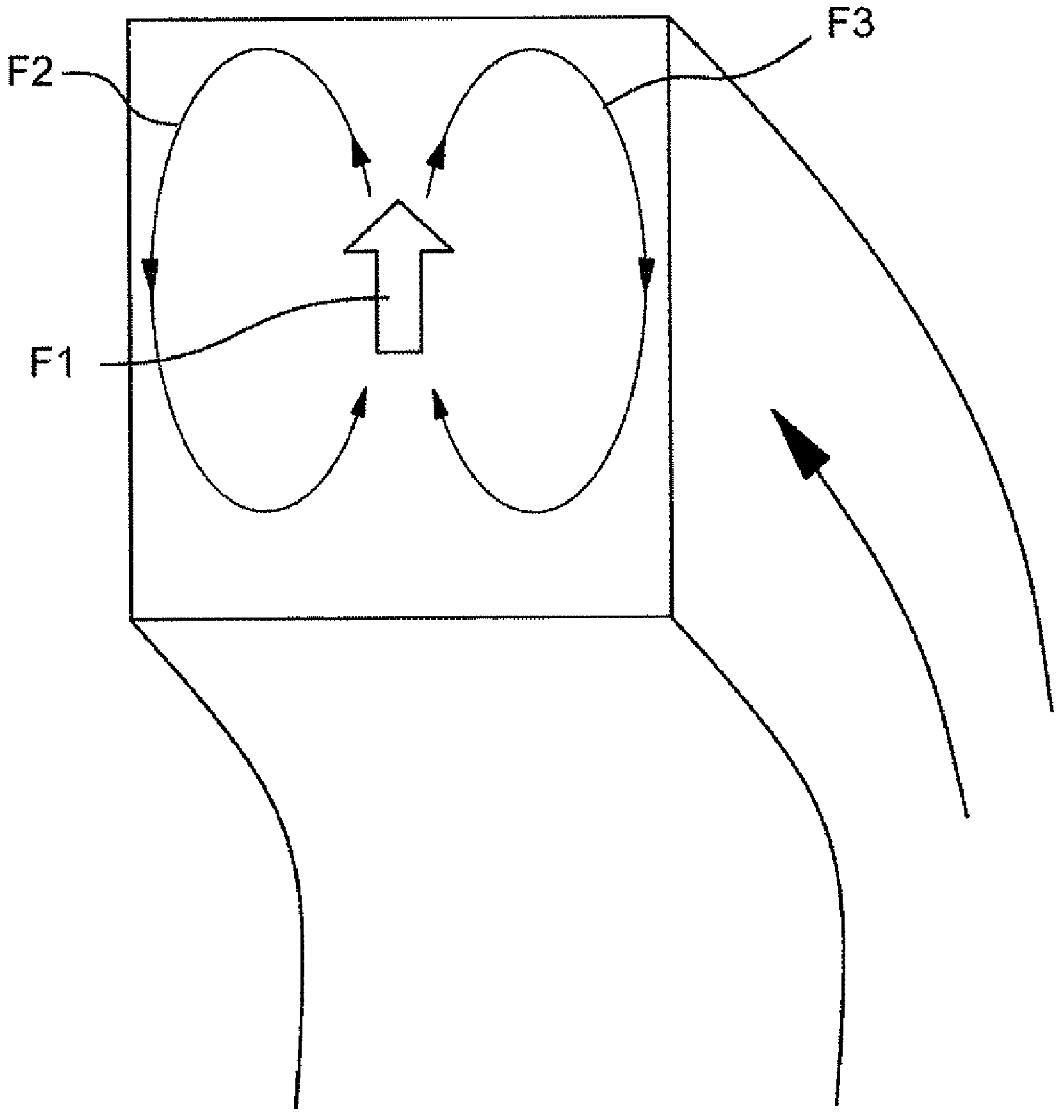
FIG. 8 is an illustrative sectional view of centrifugal force F1 and Dean vortices F2 and F3 which are generated in a bent portion.

FIG. 8 is an illustrative sectional view of centrifugal force F1 and Dean vortices F2 and F3 which are generated in the bent portion.

The channel shown in FIG. 8 has an arcuate shape which is upwardly convex, and the centrifugal force F1 is generated upwardly in the vertical direction. Centrifugal force is oriented in a direction separating from the rotation axis (the center of the bent portion). In the exemplary embodiment, the terms "centrifugal force direction" mean a direction separating from the rotation axis.

The Dean vortices F2, F3 are vortices which, in the middle portion of the channel, flow from the center of the bent portion toward the outer side (in the separating direction) in the same direction as the centrifugal force direction, and, when impinging on the outermost wall (in FIG. 7B, the ceiling face) in the centrifugal force direction, inwardly return along the wall face.

In the exemplary embodiment, in the case where the exchange flow shown in FIG. 6B is produced in transportation of the dispersion, the Dean vortices shown in FIG. 8 are generated, whereby the exchange flow and the Dean vortices cancel each other, and an influence of the exchange flow is suppressed, so that sedimentation and deposition of the particles due to the exchange flow are suppressed.

By contrast, in the case where the centrifugal force is generated downwardly in the vertical direction contrary to FIG. 8, the Dean vortices are vortices which, in the middle portion of the channel, flow downwardly in the vertical direction, and, when impinging on the outermost wall (the bottom face of the channel) in the centrifugal force direction, return to the inner side (upwardly in the vertical direction) directed to the wall face. In the case where the exchange flow shown FIG. 7B is produced, therefore, centrifugal force is generated downwardly in the vertical direction, and Dean vortices are generated, whereby the exchange flow and the Dean vortices cancel each other, and an influence of the exchange flow is suppressed, so that sedimentation and deposition of the particle due to the exchange flow are suppressed.

The sedimentation velocity of particles of a specific gravity 1.2 and a particle size of 10 μm in water is about $1\times10^{-5}$ m/s from Stokes equation (20° C.). In the case of a highly concentrated dispersion, because of the effect of the exchange flow in which the fluid is moved so as to fill the volume where the particles have existed, the particles are actually sedimented at a velocity which is higher than the above-mentioned flow velocity. Therefore, the velocity of a Dean vortex must be set in accordance with the exchange flow. The flow velocity of a Dean vortex depends on centrifugal force generated in fluid, and is changed in accordance with the velocity of the main flow (the velocity of fluid flowing through a channel) and the degree (curvature) of a bent. The velocity of a Dean vortex is adjusted by adjusting these values.

In the liquid transporting method of the exemplary embodiment, the liquid transporting channel includes the bent portion in the vertical direction. The terms "includes the bent portion in the vertical direction" mean a bent portion having the centrifugal force direction (a centrifugal force direction vector) in a vertical plate including a liquid transportation direction vector in the liquid transporting channel.

Namely, for example, a convex curved shape and a concave curved shape as viewing the channel from the side face in the liquid transportation direction are included in the bent portion.

The channel shape including the bent portion in the vertical direction is not restricted to the above. FIGS. 1A to 1D show side views of the channel shape. As shown in FIGS. 1A to 1D, the bent portion may have one of semicircular, arcuate, oval, and polygonal shapes which are convex.

Similarly, the bent portion may have one of semicircular, arcuate, oval, and polygonal shapes which are concave (downwardly convex). The shape of the bent portion is not particularly restricted.

Preferably, the channel shape including the bent portion in the vertical direction is a shape in which centrifugal force is continuously generated. Among the above shapes, curved shapes such as an oval shape, an arcuate shape, and the like are preferred.

The number of the bent portion is not particularly restricted as far as one or more bent portions are disposed. A plurality of bent portions may be disposed. Examples of such a configuration are a channel in which arcuate shapes or semicircular shapes are continuously disposed, and the like.

The section shapes of channels such as the liquid transporting channel and other channels (a dispersion introducing channel, a transporting liquid introducing channel, and the like) are not particularly restricted, and may have any one of a rectangular shape, a trapezoidal shape, a circular shape, and other shapes. From the viewpoints that only one pair of Dean vortices are generated, and that a working process can be easily applied, a rectangular shape is preferred.

In the exemplary embodiment, liquid is transported so that a Dean vortex is generated in the bent portion.

Preferably, the Dean number in the bent portion is about 0.0001 to about 10, more preferably, about 0.001 to about 1, and, still more preferably, about 0.01 to about 0.1.

When the Dean number is within the above-mentioned range, sedimentation and deposition of particles are suppressed, and hence the range is preferred.

Preferably, the channel diameter, the flow velocity, the density of particles, the channel length, the radius of curvature, and the like are adequately selected so as to attain the Dean number in the range.

In Kagaku KogaKu Ronbunshu, 2004, Vol. 30, No. 2, p. 135, it is described that the average velocity $V_{dean}$ of Dean vortices is indicated by the following expression.

$$V_{dean}=1.09\times10^{-4}De^{1.63}$$

The velocity of the exchange flow depends on the concentration of the dispersion, the gap of the sidewalls, and the sedimentation velocity of particles. In the case where the concentration is 2% and the sedimentation velocity of particles is $10^{-5}$ m/s, when the dispersion exists in the middle of a rectangular pipe of 1 mm, for example, the velocity of the exchange flow is in the order of about $1\times10^{-4}$ m/s. In this case, therefore, the Dean number for generating a Dean vortex which cancels the exchange flow is about 1.

The Dean number (De) is a dimensionless number which is important in the case where centrifugal force is to be considered, such as the flow in the bent portion, and, in the case where a circular pipe is used, given by the following expression.

$$De = \mathrm{Re}\sqrt{\frac{D}{2R}}.$$

D(m): equivalent diameter

R(m): radius of curvature

Re: Reynolds number

Preferably, the exemplary embodiment includes a step of introducing transporting liquid not containing particles into the liquid transporting channel, the transporting liquid is introduced into the liquid transporting channel from the lower side in the vertical direction, and, in the liquid transporting channel, the transporting liquid is transported below the dispersion in the vertical direction.

Figure 2A:
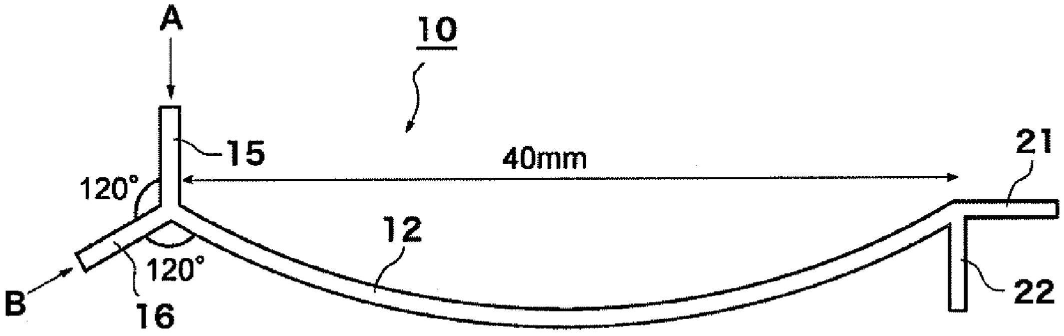
FIGS. 2A and 2B are a side view and perspective view showing an example of the liquid transporting apparatus which is used in the exemplary embodiment, respectively.
Figure 2B:
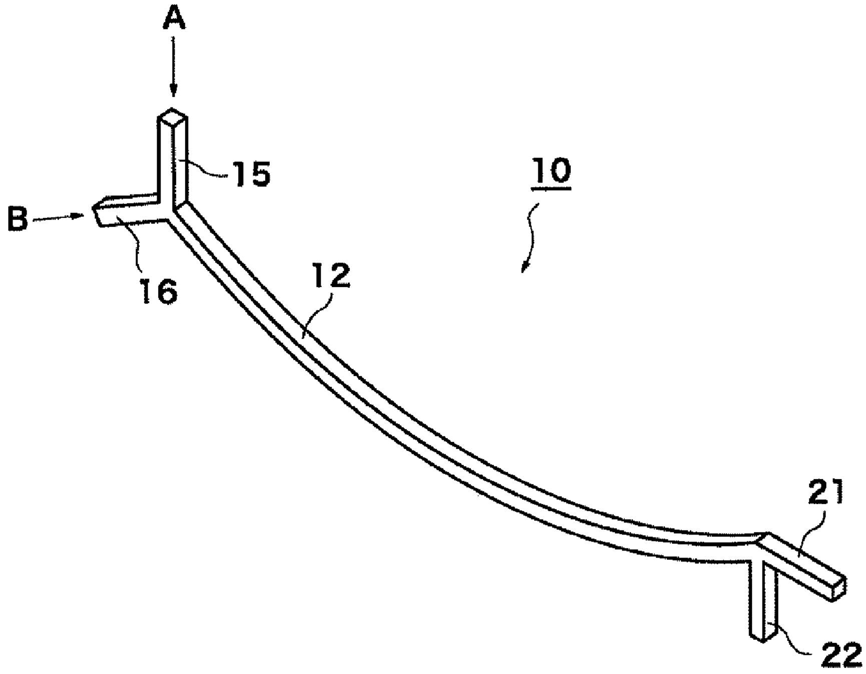

In a liquid transporting apparatus 10 shown in FIGS. 2A and 2B, dispersion A containing particles is introduced from an upper inlet 15, and transporting liquid is introduced from a lower inlet 16. The dispersion and the transporting liquid join together in a liquid transporting channel 12, and transported under a laminar flow in which the dispersion is in the upper layer, and the transporting liquid is in the lower layer.

Figure 3A:
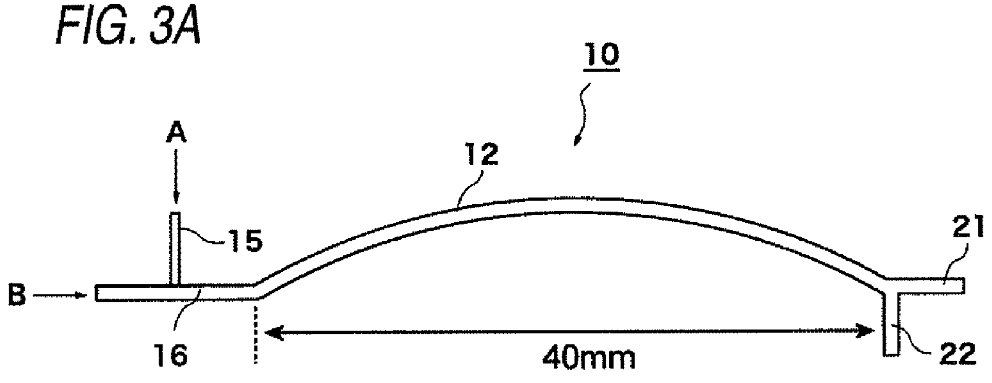
FIGS. 3A and 3B are a side view and perspective view showing another example of the liquid transporting apparatus which is used in the exemplary embodiment, respectively.
Figure 3B:
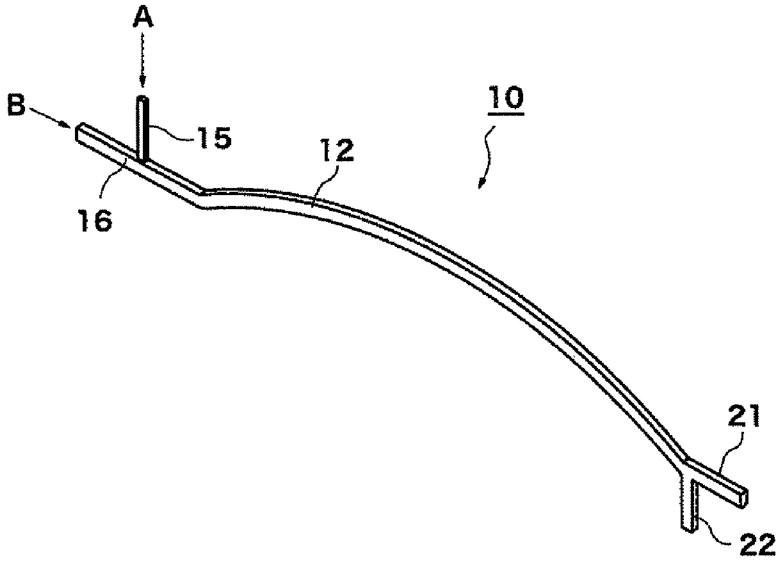

In a liquid transporting apparatus 10 shown in FIGS. 3A and 3B, similarly, dispersion containing particles is introduced from an upper inlet 15, and transporting liquid is introduced from a lower inlet 16. The dispersion and the transporting liquid join together in a liquid transporting channel 12, and transported under a laminar flow in which the dispersion is in the upper layer, and the transporting liquid is in the lower layer.

As described above, when dispersion is introduced from the upper side of the channel, sedimentation and deposition of particles are suppressed. When dispersion is introduced over the entire height of the channel, particles which are introduced into the lower portion of the channel are easily deposited, because the sedimentation distance to the bottom face of the liquid transporting channel is short.

In a preferred embodiment of the liquid transporting method of the exemplary embodiment, the liquid transporting channel has a maximum point in the vertical direction. The configuration where the channel has a maximum point in the vertical direction means that the bent portion has a shape which is upwardly convex. In other words, the configuration means that the centrifugal force direction is a vector which is directed to the upper side in the vertical direction, or a sum vector of a horizontal vector and a vector which is directed to the upper side in the vertical direction.

Specifically, a liquid transporting channel which is upwardly convex, such as the liquid transporting channel shown in FIGS. 3A and 3B is exemplified.

In the case where the liquid transporting channel has a maximum point in the vertical direction, preferably, the channel width of a dispersion introducing port is smaller than that of the liquid transporting channel. The dispersion introducing port is a channel in the junction where the dispersion is introduced into the liquid transporting channel. The channel width means a channel width which is perpendicular to the liquid transportation direction, and which is in the horizontal direction.

Preferably, the dispersion introducing port is disposed in the upper portion of the liquid transporting channel, and in the middle of the channel width. According to the configuration, the dispersion which is introduced into the liquid transporting channel is in the middle portion of the upper portion of the channel as shown in FIG. 6B.

When the liquid transporting channel has an upwardly convex shape, the centrifugal force direction is directed upwardly with respect to the horizontal direction, the Dean vortices are formed as a flow which is upwardly directed in the middle of the channel width, and which is downwardly directed in the vicinities of the both side faces. As a result, the Dean vortices and the exchange flow cancel each other, and sedimentation of the particles due to the exchange flow is suppressed.

In another preferred embodiment of the liquid transporting method of the exemplary embodiment, the liquid transporting channel has a minimum point in the vertical direction. The configuration where the channel has a minimum point in the vertical direction means that the bent portion has a shape which is downwardly convex. In other words, the configuration means that the centrifugal force direction is a vector which is directed to the lower side in the vertical direction, or a sum vector of a horizontal vector and a vector which is directed to the lower side in the vertical direction.

Specifically, a liquid transporting channel which is downwardly convex, such as the liquid transporting channel shown in FIGS. 2A and 2B is exemplified.

In the case where the liquid transporting channel has a minimum point in the vertical direction, preferably, the channel width of a dispersion introducing port is equal to that of the liquid transporting channel.

Preferably, the dispersion introducing port is disposed in the upper portion (the ceiling portion) of the liquid transporting channel, and particles are introduced uniformly along the width direction from the dispersion introducing port. According to the configuration, as shown in FIGS. 7A and 7B, the dispersion which is to be introduced into the liquid transporting channel is introduced over the channel width.

When the liquid transporting channel has a downwardly convex shape, the centrifugal force direction is directed downwardly with respect to the horizontal direction, the Dean vortices are formed as a flow which is downwardly directed in the middle of the channel width, and which is upwardly directed in the vicinities of the both side faces of the channel. As a result, the Dean vortices and the exchange flow cancel each other, and sedimentation of the particles is suppressed by the exchange flow.

Next, a classifying method in which the liquid transporting method of the exemplary embodiment is used will be described.

In the classifying method in which the liquid transporting method of the exemplary embodiment is used, the sedimentation velocity of the particles in the liquid transporting channel is close to that of the particles based on the Stokes equation, and particle classification using the sedimentation velocity is performed in a manner similar to particle classification depending on the theoretical sedimentation velocity difference.

In the exemplary embodiment, specifically, the flow velocity and the bending of the channel are selected so that Dean vortices of a degree at which the exchange flow is canceled are generated, whereby particle classification using the sedimentation velocity difference between particles of different sizes can be performed.

In the liquid transporting method of the exemplary embodiment, preferably, the liquid transporting channel is a microchannel, and the apparatus is an apparatus having a plurality of microscale channels.

In a microscale channel, both the dimensions and the flow velocity are small. In the exemplary embodiment, preferably, the Reynolds number is 2,300 or less. In the liquid transporting method of the exemplary embodiment, therefore, it is preferred that a turbulent flow is not predominant as in a usual classifying apparatus, but a laminar flow is predominant.

The Reynolds number (Re) is indicated by the following expression:

$$Re=uL/\nu$$

(u: flow rate, L: characteristic length, and ν: kinematic viscosity coefficient). When the number is 2,300 or less, a laminar flow is predominant.

As the Reynolds number is smaller, Dean vortices can be more accurately controlled. In the exemplary embodiment, preferably, the Reynolds number is 500 or less, more preferably, 100 or less, and, still more preferably, 10 or less.

In a configuration in which a laminar flow is predominant as described above, in the case where particles in dispersion are heavier than a medium liquid which is a dispersion medium, the fine particles are sedimented in the medium liquid. The sedimentation velocity is varied depending on the specific gravity or size of the fine particles. In the exemplary embodiment, the difference in sedimentation velocity may be used for the classification of the particles as described above. In the case where the particles have different particle sizes, particularly, the sedimentation velocity is proportional to a square value of the particle size, and, as the size of fine particles is larger, the fine particles are faster sedimented. Therefore, the exemplary embodiment is suitable for classifying fine particles of different particle sizes.

By contrast, in the case where the channel has a large diameter and the dispersion forms a turbulent flow, the position where particles are sedimented is varied. In the case, therefore, classification is basically impossible.

In the case where also the transporting liquid is transported simultaneously with the dispersion, preferably, both the dispersion and the transporting liquid are transported under a laminar flow in the liquid transporting channel.

The method of producing the liquid transporting apparatus of the exemplary embodiment is not particularly restricted. The apparatus may be produced by any one of known methods.

The liquid transporting apparatus of the exemplary embodiment may be produced on a solid substrate by the micro processing technique.

Examples of a material used as the solid substrate are a metal, silicon, teflon (registered trademark), glass, ceramic, plastic, and the like. Among the materials, a metal, silicon, teflon (registered trademark), glass, and ceramic are preferable from the viewpoints of heat resistance, pressure resistance, solvent resistance, and optical transparency, and, particularly preferably, glass.

An example of the micro processing technique for producing the channels is the method described in "Microreactor—Shinjidai no Gosei Gijyutsu—" (2003, published by CMC, supervised by YOSHIDA Junichi), "Bisai Kako Gijyutsu Oyohen—Photonics, Electronics, and Mechatronics heno Oyo—" (2003, published by NTS, edited by Kobunshi Gakkai Gyoji Iinkai), etc.

Representative methods are LIGA technology using X-ray lithography, high-aspect ratio photolithography using EPON SU-8, a microdischarge processing method (μ-EDM), a silicon high-aspect ratio processing method by Deep RIE, a Hot Emboss processing method, a photo-shaping method, a laser processing method, an ion beam processing method, a mechanical micro-cutting processing method using a micro-tool made of a hard material such as diamond, and the like. These technologies may be used alone or as combination thereof. Preferable micro processing technologies are LIGA technology using X-ray lithography, high-aspect ratio photolithography using EPON SU-8, a microdischarge processing method (μ-EDM), and a mechanical micro-cutting processing method.

The channels used in the exemplary embodiment can be produced also by employing a pattern formed by using a photoresist on a silicon wafer, as a mold, pouring a resin into the mold, and solidifying the resin (molding method). The molding method can use a silicone resin represented by polydimethylsiloxane (PDMS) or its derivative.

In production of the liquid transporting apparatus of the exemplary embodiment, it is possible to use a bonding technology. Usually, bonding technologies are roughly classified into solid phase bonding and liquid phase bonding. As a usual bonding method, pressure bonding and diffusion bonding are representative bonding methods in the solid phase bonding, and welding, eutectic bonding, soldering, adhesion, and the like are representative bonding methods in the liquid phase bonding.

In the bonding, furthermore, highly precise bonding method which does not involve destruction of a minute structure such as a channel by modification or deformation of a material due to high temperature heating, in which dimensional accuracy is maintained, and which is highly accurate is desirable. Examples of such a technology include silicon direct bonding, anode bonding, surface activation bonding, direct bonding using hydrogen bonding, bonding using HF aqueous solution, Au—Si eutectic bonding, and void-free adhesion.

The liquid transporting apparatus of the exemplary embodiment may be formed by stacking pattern members (thin-film pattern members). Preferably, the pattern members have a thickness of 5 to 50 μm, and, more preferably, 10 to 30 μm. The liquid transporting apparatus of the exemplary embodiment may be an apparatus that is formed by stacking pattern members in which a predetermined two-dimensional pattern is formed. The pattern members may be stacked in a state where the faces of the pattern members are directly contacted and bonded together.

An example of a producing method using a bonding technology is a producing method including:

(i) a step (donor substrate producing step) of forming a plurality of pattern members respectively corresponding to section shapes of the liquid transporting apparatus to be produced, on a first substrate; and (ii) a step (bonding step) of repeating bonding and separating processes on the first substrate on which the plurality of pattern members are formed, and a second substrate, whereby the plurality of pattern members on the first substrate are transferred to the second substrate.

For example, the producing method disclosed in JP-A-2006-187684 may be referred.

Next, the dispersion will be described. In the exemplary embodiment, the specific gravity of particles in the dispersion is larger than the specific gravities of the medium liquid which functions as a dispersion medium for the dispersion, and the transporting liquid.

In the dispersion, preferably, particles having a volume-average particle size of 0.1 to 1,000 μm are dispersed in the medium liquid, and the difference which is obtained by subtracting the specific gravity of the medium liquid from that of the particles is 0.01 to 20.

As the particles contained in the dispersion, any of resin particles, inorganic particles, metal particles, ceramic particles, and the like can be preferably used as far as the volume-average particle size is 0.1 to 1,000

Preferably, the volume-average particle size of the particles is 0.1 to 1,000 μm, more preferably, 0.1 to 500 μm, still more preferably, 0.1 to 200 μm, and, particularly preferably, 0.1 to 50 μm. When the volume-average particle size of the particles is equal to or smaller than 1,000 μm, clogging of the channel hardly occurs, and hence this is preferred. Moreover, the sedimentation speed is adequate, deposition on the bottom face of the channel and blocking of the channel are suppressed, and hence this is preferred. When the volume-average particle size of the particles is equal to or larger than 0.1 μm, interaction with respect to the inner wall face of the channel hardly occurs so that adhesion hardly occurs, and hence this is preferred.

The shape of the particles is not particularly restricted. When the particles have a needle form and in particular the long axis thereof is larger than ¼ of the channel width, however, the possibility that clogging of the channel occurs becomes high. From this viewpoint, a ratio (the long axis length/the short axis length) of the long axis length of the particles to the short axis length thereof is preferably in the range from 1 to 50, and, more preferably, from 1 to 20. It is preferable that the channel width is appropriately selected in accordance with the particle size and the particle shape.

The kind of the particles may be any one of the kinds listed below, but is not restricted thereto. For example, the kinds are organic crystals or aggregates such as polymer fine particles or pigment particles, inorganic crystals or aggregates, metal fine particles, and metal compound fine particles such as a metal oxide, a metal sulfide, and a metal nitride.

Specific examples of the polymer fine particles are fine particles of polyvinyl butyral resin, polyvinyl acetal resin, polyarylate resin, polycarbonate resin, polyester resin, phenoxy resin, polyvinyl chloride resin, polyvinylidene chloride resin, polyvinyl acetate resin, polystyrene resin, acrylic resin, methacrylic resin, styrene/acrylic resin, styrene/methacrylic resin, polyacrylamide resin, polyamide resin, polyvinyl pyridine resin, cellulose-based resin, polyurethane resin, epoxy resin, silicone resin, polyvinyl alcohol resin, casein, vinyl chloride/vinyl acetate copolymer, modified vinyl chloride/vinyl acetate copolymer, vinyl chloride/vinyl acetate/maleic anhydride copolymer, styrene/butadiene copolymer, vinylidene chloride/acrylonitrile copolymer, styrene/alkyd resin, and phenol/formaldehyde resin.

Examples of the metal or metal compound fine particles include fine particles of: carbon black; a metal such as zinc, aluminum, copper, iron, nickel, chromium, titanium, and the like, or alloys thereof; metal oxides such as $TiO_2$, $SnO_2$, $Sb_2O_3$, $In_2O_3$, ZnO, MgO, iron oxide, and the like, or any compound thereof; metal nitrides such as silicon nitride, and the like; and any combination thereof.

Various methods of producing these fine particles may be used. In many cases, fine particles are produced by synthesis in medium liquid, and then subjected to classification as they are. Sometimes, fine particles may be produced by mechanically pulverizing a bulk material and then dispersing the resulting fine particles in medium liquid, followed by classification. In this case, the material is often pulverized in the medium liquid, and the resulting fine particles are classified directly.

In the case where powder (fine particles) which is produced in a dry process is to be classified, it is necessary to previously disperse the powder in medium liquid. An example of a method of dispersing the dry powder in the medium liquid is a method using a sand mill, a colloid mill, an attritor, a ball mill, a Dyno mill, a high-pressure homogenizer, an ultrasonic disperser, a co-ball mill, a roll mill or the like. In this case, it is preferable to perform the process under conditions where primary particles are not pulverized by the dispersion process.

Preferably, the difference which is obtained by subtracting the specific gravity of the medium liquid from that of the particles is 0.01 to 20, more preferably, 0.05 to 11, and, still more preferably, 0.05 to 4. When the difference which is obtained by subtracting the specific gravity of the medium liquid from that of the fine particles is equal to or larger than 0.01, the particles are satisfactorily sedimented, and hence this is preferred. By contrast, when the difference is equal to smaller than 20, the particles are easily transported, and hence this is preferred.

As the medium liquid, any medium liquid is preferably used as far as, as described above, the difference obtained by subtracting the specific gravity of the medium liquid from that of the particles is 0.01 to 20. Examples of the medium liquid are water, aqueous media, organic solvent type media, and the like.

The water may be ion-exchange water, distilled water, electrolytic ion water, or the like. Specific examples of the organic solvent type media are methanol, ethanol, n-propanol, n-butanol, benzyl alcohol, methylcellosolve, ethylcellosolve, acetone, methyl ethyl ketone, cyclohexanone, methyl acetate, n-butyl acetate, dioxane, tetrahydrofuran, methylene chloride, chloroform, chlorobenzene, toluene, xylene, and the like, and mixtures of two or more thereof.

A preferred example of the medium liquid varies depending on the kind of the particles. As preferred examples of the medium liquid for each kind of the particles, the medium liquid to be combined with polymer particles (the specific gravity thereof is generally from about 1.05 to 1.6) are aqueous solvents, organic solvents such as alcohols, xylene, and the like, acidic or alkaline waters, and the like which do not dissolve the particles.

Further, preferred examples of the medium liquid to be combined with the metal or metal compound fine particles (the specific gravity thereof is generally from about 2 to 10) are water, organic solvents such as alcohols, xylene and the like, and oils which do not oxidize or reduce to react with the metal or the like.

More preferred examples of combinations of the particles and the medium liquid are a combination of polymer particles and an aqueous medium, and that of a metal or a metal compound and a low-viscosity oily medium. Among examples, the combination of polymer fine particles and an aqueous medium is particularly preferable.

Preferable examples of the combination of the particles and the medium liquid are a combination of styrene/acrylic resin particles and an aqueous medium, that of styrene/methacrylic resin particles and an aqueous medium, and that of polyester resin particles and an aqueous medium.

The content rate of the particles in the particle dispersion is preferably from 0.1 to 40 vol. %, and, more preferably, from 1 to 25 vol. %. When the content rate of the particles in the dispersion is equal to or larger than 0.1 vol. %, the recovery is easily performed, and hence this is preferred. When the content rate is equal to or smaller than 40 vol. %, clogging of a channel is suppressed, and hence this is preferred.

In the exemplary embodiment, even in the case where a dispersion which has a relatively high particle concentration, and which is conventionally difficult to be transported is used, particularly, deposition of the particles due to sedimentation is suppressed.

In the exemplary embodiment, the volume-average particle size of the particles is a value which is measured by using Coulter counter TA-II model (manufactured by Beckman Coulter, Inc.) except when the particles have the particle size described below (5 μm or less). In this case, the volume-average particle size is measured by using an optimum aperture depending on the particle size level of the particles. In the case where fine particles have a particle size of 5 μm or less, however, the volume-average particle size is measured by using a laser diffraction scattering particle size distribution measuring device (LA-920, manufactured by HORIBA, Ltd.).

The specific gravity of the particles is measured by using Ultrapycnometer 1000 manufactured by Yuasa Ionics Co., Ltd. by the gas phase displacement method (pycnometer method).

The specific gravity of the medium liquid is measured by using a specific gravity measuring kit AD-1653 manufactured by A & D Co., Ltd.

In the classifying method of the exemplary embodiment, the transporting liquid is liquid not containing the particles to be classified. In the exemplary embodiment, preferably, the transporting liquid is identical with the medium liquid.

In the case where the transporting liquid is different from the medium liquid, moreover, the transporting liquid is preferably selected from the specific examples of the medium liquid described above.

Furthermore, a preferred mode of the specific gravity of the transporting liquid with respect to the particles is identical with the preferred mode of the specific gravity of the medium liquid with respect to the particles.

EXAMPLES

Although hereinafter the exemplary embodiment will be described in detail by way of examples and comparative examples, the exemplary embodiment is not restricted to the following examples.

(Dispersion)

Monodisperse polyester true spherical particles (density: 1,200 kg/m$^3$) having a particle size of 6 μm are dispersed in pure water to prepare an aqueous dispersion (particle dispersion (1)) having a concentration of 2 wt. %.

In the following examples, the dispersion and the transporting liquid are transported by using a syringe pump.

Example 1

Downwardly Curved Type (the Case where Particles Exist in the Vicinity of Sidewall)

The liquid transporting apparatus shown in FIGS. 2A and 2B is actually produced by applying the microprocess on an acrylic resin. Furthermore, an upper discharging channel 21 and a lower discharging channel 22 are formed in the outlet. The particle dispersion (1) is transported at 5 ml/h from the upper inlet 15, and pure water is transported at 15 ml/h from the lower inlet 16. The particle existing weight ratio of the recovery liquid from the upper discharging channel 21 and that from the lower discharging channel 22 is 99.5:0.5.

In the liquid transporting apparatus shown in FIGS. 2A and 2B, all of the channels have a rectangular shape of 1 mm×1 mm, the radius of curvature of the bent portion is 40 mm, and the length of the bent portion is 40 mm.

Comparative Example 1

Horizontal Type

Figure 5:
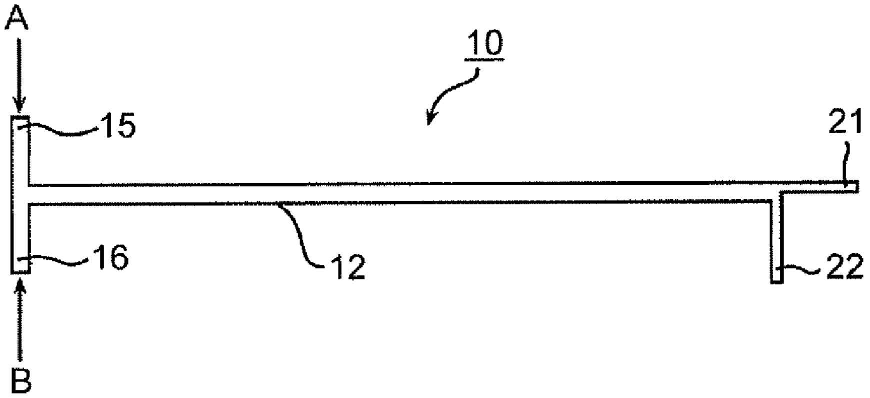
FIG. 5 is a side view showing an example of a conventional liquid transporting apparatus.

The dispersion is transported in the same manner as Example 1 except that the liquid transporting apparatus shown in FIG. 5 is used.

In the liquid transporting apparatus shown in FIG. 5, all of the channels have a rectangular shape of 1 mm×1 mm, the length of the liquid transporting channel is 40 mm.

The particle exiting ratio of the upper and lower portions is measured in the same manner as Example 1. In Comparative example 1, the particle exiting ratio of the upper and lower portions is 53:47.

Example 2

Upwardly Curved Type (the Case where Particles are Separated from Sidewall)

The particle dispersion (1) is transported at 1 ml/h from the upper inlet 15, and pure water is transported at 20 ml/h from the lower inlet 16 by using the liquid transporting apparatus shown in FIGS. 3A and 3B. A small amount of a sample taken from the lower discharging channel 22 is observed under a microscope. As a result, no particles exist in the sample.

In the liquid transporting apparatus shown in FIGS. 3A and 3B, all of the channels except the introducing channel for the particle dispersion have a rectangular shape of 1 mm×1 mm, the radius of curvature of the bent portion is 40 mm, and the length of the bent portion is 40 mm. The introducing channel for the particle dispersion has a rectangular shape of 0.5 mm×0.5 mm.

Example 3

Figure 4:
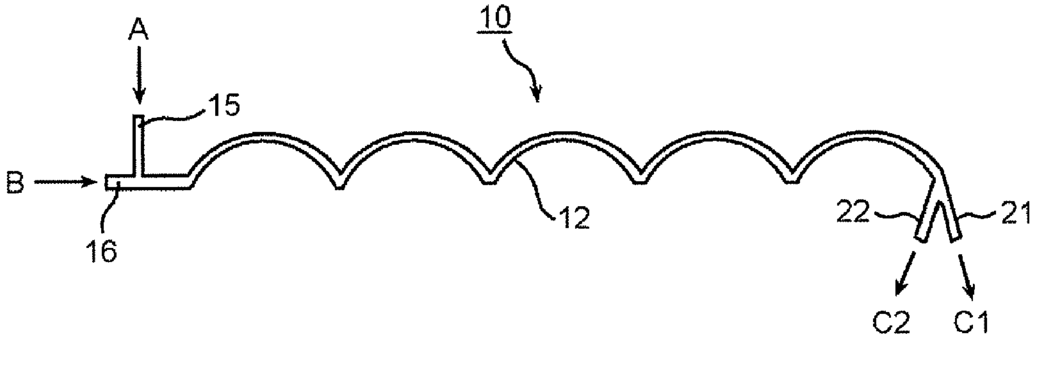
FIG. 4 is a side view showing a further example of the liquid transporting apparatus which is used in the exemplary embodiment.
Figure 9:
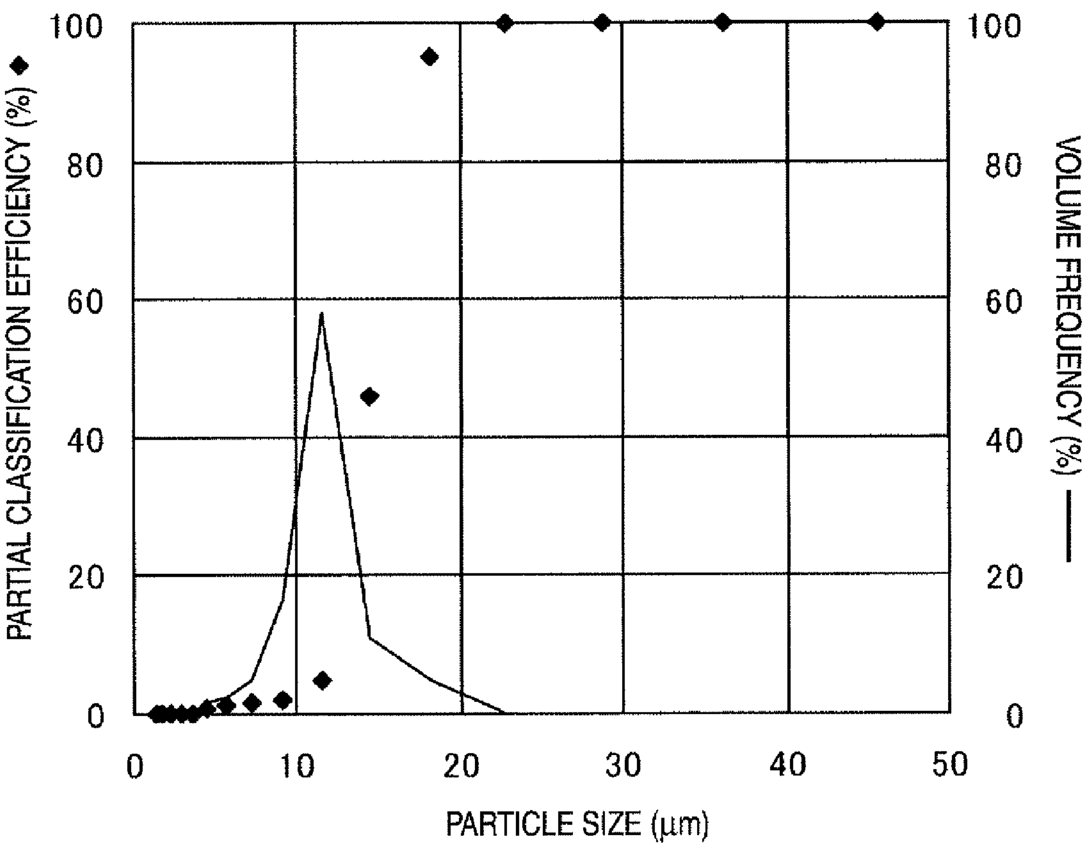
FIG. 9 is a graph showing the partial separation efficiency and the volume frequency in Examples.

A device which is shown in FIG. 4, and in which five bent portions are arranged is produced. Polyester true spherical particles (density: 1,200 kg/m$^3$) having an average particle size of 11 μm are dispersed in pure water to prepare an aqueous dispersion having a concentration of 2 wt. %. In the device, the dispersion is transported at 1 ml/h from the upper inlet 15, and pure water is transported at 20 ml/h from the lower inlet 16. Particles are taken out from the upper discharging channel 21 and the lower discharging channel 22, and the particle size distribution and the weight are measured to obtain the partial separation efficiency. FIG. 9 shows the result. In the result, the cut point (D50) is 14.7 μm, and the classification accuracy index k (=D25/D75) is 0.8.

(Other Embodiment)

In another embodiment, a liquid transporting apparatus has: a dispersion introducing port into which dispersion is introduced; a liquid transporting channel through which the dispersion is transported; and a discharging port from which the dispersion is discharged, and the liquid transporting channel includes a bent portion in the vertical direction.

According to the embodiment, it is not required to perform the liquid transportation in the gravitational direction, and hence the height of the whole apparatus in the gravitational direction is reduced. Moreover, it is not required to apply an external force, and hence the liquid transportation is performed with reduced energy.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A method for transporting dispersion, wherein the method comprises:

introducing dispersion containing particles into a liquid transporting channel from a dispersion introducing port;

transporting the dispersion in a laminar flow through the liquid transporting channel; and discharging the dispersion from a downstream of the liquid transporting channel, and the liquid transporting channel comprises a bent portion in a vertical direction, and a Dean vortex which cancels an exchange flow that is produced by movement of the particles caused by gravitational force is generated in the bent portion, wherein the dispersion is substantially a Newtonian fluid.

2. The method for transporting dispersion according to claim 1, wherein the method further comprises:

introducing transporting liquid not containing particles into the liquid transporting channel, from a transporting liquid introducing port that meets the transporting channel at a point lower on the transporting channel than the dispersion in a vertical direction; and transporting the transporting liquid through the liquid transporting channel in a laminar flow, wherein the transporting liquid is substantially a Newtonian fluid.

3. The method for transporting dispersion according to claim 2, wherein both the dispersion and the transporting liquid are transported through the liquid transporting channel in a laminar flow.

4. The method for transporting dispersion according to claim 1, wherein a channel shape in the bent portion has one of semicircular, arcuate, oval, and polygonal shapes.

5. The method for transporting dispersion according to claim 1, wherein a Dean number in the bent portion is about 0.0001 to about 10.

6. The method for transporting dispersion according to claim 1, wherein the liquid transporting channel has a maximum point in the vertical direction, and a channel width of the dispersion introducing port is small than a channel width of the liquid transporting channel.

7. The method for transporting dispersion according to claim 1, wherein the liquid transporting channel has a minimum point in the vertical direction, and a channel width of the dispersion introducing port is substantially equal to a channel width of the liquid transporting channel.

8. A classifying method wherein the method for transporting dispersion according to claim 1 is performed, a specific gravity of the particles contained in the dispersion is larger than a specific gravity of a dispersion medium of the dispersion, and the particles are classified in the step of transporting the dispersion through the liquid transporting channel.

9. A liquid transporting apparatus which comprises:

a liquid transporting channel through which a dispersion containing particles is transported in a laminar flow;

a dispersion introducing port which, in one end, has an opening portion into which the dispersion is introduced, and in which another end is connected to the liquid transporting channel; and a discharging port which, in one end, has an opening portion, and in which another end is connected to the liquid transporting channel, the discharging port discharging the dispersion from a downstream of the liquid transporting channel, wherein the liquid transporting channel includes a bent portion in a vertical direction, a Dean vortex which cancels an exchange flow that is produced by movement of the particles caused by gravitational force is generated in the bent portion, and the dispersion is substantially a Newtonian fluid.

10. The liquid transporting apparatus according to claim 9, wherein the apparatus further comprises a transporting liquid introducing channel through which a transporting liquid not containing particles introduced into the liquid transporting channel from a transporting liquid introducing port that meets the transporting channel at a point lower on the transporting channel than the dispersion introducing port in a vertical direction, wherein the transporting liquid is substantially a Newtonian fluid.

11. The liquid transporting apparatus according to claim 9, wherein a channel shape in the bent portion has one of semicircular, arcuate, oval, and polygonal shapes.

12. The liquid transporting apparatus according to claim 9, wherein the liquid transporting channel has a maximum point in a vertical direction, and a channel width of the dispersion introducing port is small than a channel width of the liquid transporting channel.

13. The liquid transporting apparatus according to claim 9, wherein the liquid transporting channel has a minimum point in a vertical direction, and a channel width of the dispersion introducing port is substantially equal to a channel width of the liquid transporting channel.

14. The method for transporting dispersion according to claim 1, wherein the liquid transporting channel includes at least two introducing ports and two outlet ports, the at least two outlets ports being downstream from the at least two introducing ports and the dispersion introducing port being one of the at least two introducing ports.

15. The liquid transporting apparatus according to claim 9, wherein the liquid transporting channel includes at least two introducing ports and two outlet ports, the at least two outlets ports being downstream from the at least two introducing ports and the dispersion introducing port being one of the at least two introducing ports.

16. The method for transporting dispersion according to claim 14, wherein the dispersion enters the liquid transporting channel via the dispersion introducing port and exits via a dispersion outlet port, a transporting liquid enters the liquid transporting channel via a transporting liquid introducing channel and exits via a transporting liquid outlet port, the dispersion introducing port being formed above the transporting liquid introducing port, and the dispersion outlet port being formed above the transporting liquid outlet port.

17. The liquid transporting apparatus according to claim 15, wherein the dispersion enters the liquid transporting channel via the dispersion introducing port and exits via a dispersion outlet port, a transporting liquid enters the liquid transporting channel via a transporting liquid introducing channel and exits via a transporting liquid outlet port, the dispersion introducing port being formed above the transporting liquid introducing port, and the dispersion outlet port being formed above the transporting liquid outlet port.

* * * * *